(12) United States Patent
Cao et al.

(10) Patent No.: US 12,610,291 B2
(45) Date of Patent: Apr. 21, 2026

(54) METHODS AND DEVICES FOR UPDATING IAB-NODE CONFIGURATION INFORMATION DURING INTER-DONOR MIGRATION

(71) Applicant: ZTE Corporation, Shenzhen (CN)

(72) Inventors: Kun Cao, Shenzhen (CN); Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 646 days.

(21) Appl. No.: 17/875,777

(22) Filed: Jul. 28, 2022

(65) Prior Publication Data

US 2022/0369177 A1 Nov. 17, 2022

Related U.S. Application Data

(63) Continuation of application No. PCT/CN2020/078219, filed on Mar. 6, 2020.

(51) Int. Cl.
*H04W 36/00* (2009.01)

(52) U.S. Cl.
CPC .............................. *H04W 36/0064* (2023.05)

(58) Field of Classification Search
CPC ........... H04W 36/087; H04W 36/0064; H04W 84/005; H04W 84/047
See application file for complete search history.

(56) References Cited

U.S. PATENT DOCUMENTS

| 12,212,955 B2 * | 1/2025 | Wang .................... H04W 36/16 |
| 2017/0332269 A1 | 11/2017 | Wang |
| 2019/0223078 A1 | 7/2019 | Sirotkin et al. |
(Continued)

FOREIGN PATENT DOCUMENTS

| CN | 110662266 A | 1/2020 |
| CN | 110740485 A | 1/2020 |
(Continued)

OTHER PUBLICATIONS

Partial Supplementary European Search Report regarding EP 20 88 9814 dated Apr. 12, 2023, 18 pages.
(Continued)

*Primary Examiner* — Mahran Y Abu Roumi
(74) *Attorney, Agent, or Firm* — Crowell & Moring LLP

(57) ABSTRACT

The present disclosure describes methods, systems, and devices for updating configuration information for a migrating integrated access backhaul node (IAB-node) during an inter-donor migration from a source IAB-donor to a target IAB-donor. One method includes providing, by a target IAB-donor central unit (CU), configuration information for a migrating IAB-node distributed unit (DU) in a dedicated radio resource control (RRC) message during handover preparation. The method further includes sending, by the target IAB-donor CU, a XnAP message to a source IAB-donor CU, the XnAP message comprising the configuration information as an RRC transparent container, and then the source IAB-donor CU sends the dedicated RRC message to a migrating IAB-node mobile termination (MT), the dedicated RRC message comprising the configuration information.

6 Claims, 12 Drawing Sheets

(56) References Cited

U.S. PATENT DOCUMENTS

| | | | | |
|---|---|---|---|---|
| 2019/0289500 | A1 | 9/2019 | Abedini et al. | |
| 2019/0394738 | A1 | 12/2019 | Abedini et al. | |
| 2021/0227435 | A1* | 7/2021 | Hsieh | H04W 36/087 |
| 2022/0124706 | A1* | 4/2022 | Abedini | H04W 88/14 |
| 2022/0279555 | A1* | 9/2022 | Xiao | H04W 72/0446 |
| 2022/0369177 | A1 | 11/2022 | Cao et al. | |
| 2023/0098848 | A1* | 3/2023 | Ishii | H04W 36/0033 370/216 |
| 2023/0145711 | A1* | 5/2023 | Koskinen | H04W 36/0072 370/329 |

FOREIGN PATENT DOCUMENTS

| | | | |
|---|---|---|---|
| CN | 110830979 A | 2/2020 | |
| CN | 112088544 A | 12/2020 | |
| EP | 4082245 A4 | 1/2020 | |
| EP | 3 780 746 A1 | 2/2021 | |
| WO | 2019/192524 A1 | 10/2019 | |
| WO | WO 2019/246446 A1 | 12/2019 | |
| WO | WO2021098085 | 1/2020 | |
| WO | WO 2020033655 A1 | 2/2020 | |

OTHER PUBLICATIONS

"3rd Generation Partnership Project, Technical Specification Group Radio Access Network; NR; Study on Integrated Access and Backhaul (Release 16)," 3GPP Draft; 38874-G00, 3rd Generation Partnership Project (3GPP), Mobile Competence Centre, F-06921, Sophia-Antipolis Cedex, France, Jan. 11, 2019, XP051576885, Retrieved from the Internet: URL:http://www.3gpp.org/ftp/tsg%5Fran/WG2%5FRL/Specifications/201812%5Ffinal%5Fspecs%5Fafter%5FRAN%5F82/38874%2Dg00%2Ezip.

Zte et al, "Discussion on Inter-CU IAB migration handling," 3GPP Draft; R3-196689, 3rd Generation Partnership Project (3GPP), Mobile Competence Centre; 650, Route Des Lucioles, F-06921 Sophia-Antipolis Cedex, France, vol. RAN WG3, No. Reno, USA; Nov. 18, 2019-Nov. 22, 2019 Nov. 9, 2019, XP051823893, Retrieved from the Internet: URL:https://ftp.3gpp.org/tsg_ran/WG3_lu/TSGR3_106/Docs/R3-196689.zip R3-196689.doc.

International Search Repor and Written Opinion regarding PCT/CN2020/078219 dated Dec. 9, 2020.

CATT. "(TP for NR_IAB BL CR for TS 38.401) Inter-CU IAB-node migration" *3GPP TSG-RAN WG3 #105bis RJ-195365*, Oct. 18, 2019.

ZTE et al. "Discussion on network-controlled IAB migration hanling" *3GPP TSG RAN WG3 Meeting #105 RJ-193654*, Aug. 30, 2019.

Canadian Patent Office Examination Report regarding 3,162,217 dated Oct. 31, 2023.

Chinese Office Action and English translation of the Office Action regarding 3 202080098064.3 dated Jul. 10, 2024, 12 pages.

Nokia, Nokia Shanghai Bell, R3-185170, "IAB Topology Discovery for Routing and Topology Management," 3GPP tsg_ran\wg3_iu,tsgr3_101, Aug. 28, 2018, 6 pages.

Indian Patent Office First Examination Report regarding 202217044234 Aug. 17, 2023.

Koren-language Office Action with English summary issued in Korean Patent Application No. 10-2022-7026490 dated May 2, 2025 (6 pages).

European Patent Office Office Action issued in Application No. 20 889 814.8, Aug. 14, 2025, (14 pages).

Korean Notice of Allowance with English summary regarding Application No. 10-2022-7026490 added Dec. 22, 2025 (8 pages).

* cited by examiner

Processor(s) 221

Memories 222

Operating system 224

Instructions 226

Parameters 228

System Circuitry 204

I/O Interface 206

Tx / Rx Circuitry 208
2G/3G/4G/LTE/5G

Network interface circuitry 209

200

500 providing, by a target IAB-donor central unit (CU), configuration information for the migrating IAB-node distributed unit (DU) and served cells in a dedicated RRC message e.g. RRCReconfiguration message          510 sending, by the target IAB-donor CU, a XnAP message including a generated RRCReconfiguration message to a source IAB-donor, the RRCReconfiguration message comprising the provided configuration information          520 sending, by a source IAB-donor CU, the RRCReconfiguration message to a migrating IAB-node mobile termination (MT), the RRCReconfiguration message comprising the provided configuration information          530 upon receiving the RRCReconfiguration message, forwarding, by the migrating IAB-node MT, the provided configuration information to a migrating IAB-node DU          540

FIG. 5

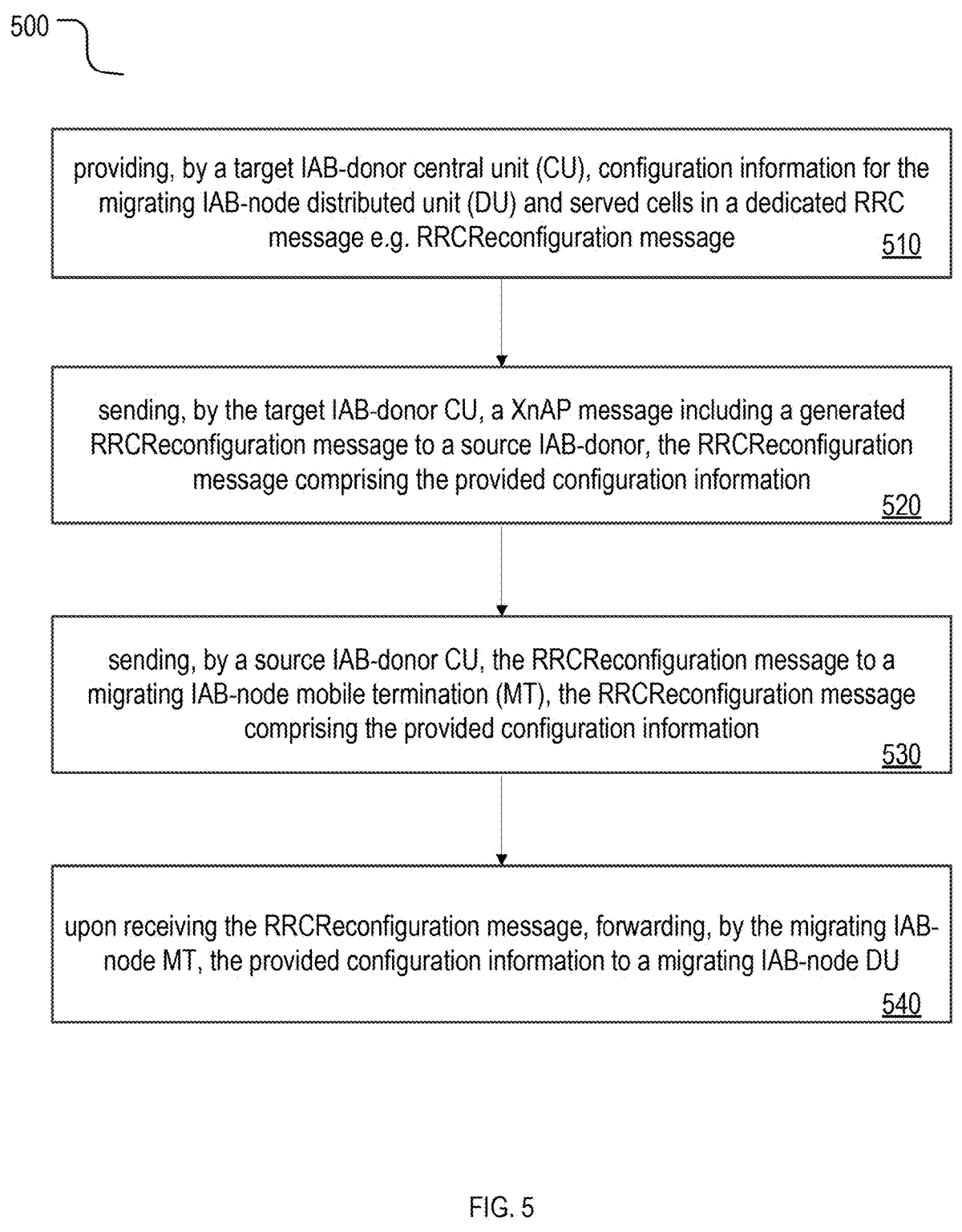

700 upon migrating from the source IAB-donor to the target IAB-donor, the migrating IAB-node DU sends a F1 setup request message to the target IAB-donor CU, the F1 setup request message comprising previous configuration information for the migrating IAB-node prior to migration   710 the target IAB-donor CU determines whether a conflict of configuration information is present

720 providing, by the target IAB-donor CU in response to the conflict, configuration information for the migrating IAB-node and setting a cause value

730 sending, by the target IAB-donor CU, a F1 setup failure message to the migrating IAB-node DU, the F1 setup failure message comprising the newly allocated configuration information for the migrating IAB-node

740 the migrating IAB-node DU configures the migrating IAB-node based on the newly allocated configuration information

800 upon migrating from the source IAB-donor to the target IAB-donor, the migrating IAB-node DU sends a F1 setup request message to the target IAB-donor CU, the F1 setup request message comprising previous NR PCI and NR CGI for the migrating IAB-node prior to migration                                                                810 sending, by the target IAB-donor CU in response to a conflict with NR PCI and NR CGI, a F1 setup response message to a migrating IAB-node DU, the F1 setup response message comprising a cell-to-modify list comprising a previous PCI and/or a previous CGI, and a NR PCI and/or a NR CGI                    820 the migrating IAB-node may regard the allocated old PCI and/or NR PCI and NR CGI as the physical cell ID and gNB-DU identification

830 the migrating IAB-node may active the cell indicated by the allocated NR CGI and reconfigure the cell indicated by the allocated NR PCI

METHODS AND DEVICES FOR UPDATING IAB-NODE CONFIGURATION INFORMATION DURING INTER-DONOR MIGRATION

CROSS-REFERENCE TO RELATED APPLICATION

This application is a continuation application of PCT International Patent Application No. PCT/CN2020/078219, filed with the China National Intellectual Property Administration, PRC on Mar. 6, 2020, which is herein incorporated by reference in its entirety.

TECHNICAL FIELD

The present disclosure is directed generally to wireless communications. Particularly, the present disclosure relates to methods and devices for updating integrated access backhaul (IAB) node configuration information during inter-donor migration.

BACKGROUND

Wireless communication technologies are moving the world toward an increasingly connected and networked society. Compared with long term evolution (LTE), the fifth generation (5G) new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency.

The 5G NR may include an integrated access backhaul (IAB) implementation. The IAB implementation may include one or more IAB-donors and multiple connecting IAB-nodes. Currently, there are problems and/or issues associated with configuring IAB nodes, particularly when one IAB node migrates from one IAB-donor to another IAB-donor.

The present disclosure may address at least some of problems/issues associated with the existing system to improve the performance of the wireless communication.

SUMMARY

This document relates to methods, systems, and devices for wireless communication, and more specifically, for updating integrated access backhaul (IAB) node configuration information during inter-donor migration.

In one embodiment, the present disclosure describes a method for wireless communication. The method includes updating configuration information for a migrating integrated access backhaul node (IAB-node) during an inter-donor migration from a source IAB-donor to a target IAB-donor by: providing, by a target IAB-donor central unit (CU), configuration information for a migrating IAB-node distributed unit (DU) in a dedicated radio resource control (RRC) message, i.e. RRCReconfiguration message, during handover preparation; and sending, by the target IAB-donor CU, a XnAP message to a source IAB-donor CU, the XnAP message comprising the configuration information as an RRC transparent container, and then the source IAB-donor CU sends the dedicated RRC message to a migrating IAB-node mobile termination (MT), the dedicated RRC message comprising the configuration information.

In another embodiment, the present disclosure describes a method for wireless communication. The method includes updating configuration information for a migrating integrated access backhaul node (IAB-node) during an inter-donor migration from a source IAB-donor to a target IAB-donor by sending, by a target IAB-donor central unit (CU), a F1-AP message to a migrating IAB-node distributed unit (DU), the F1-AP message comprising new configuration information comprising a new radio (NR) physical cell identifier (PCI) and/or a NR cell global identifier (CGI).

In another embodiment, the present disclosure describes a method for wireless communication. The method includes updating configuration information for a migrating integrated access backhaul node (IAB-node) during an inter-donor migration from a source IAB-donor to a target IAB-donor by allocating, by a target IAB-donor central unit (CU), configuration information for the migrating IAB-node and setting a cause value in a F1 setup failure; and sending, by the target IAB-donor CU, the F1 setup failure message to a migrating IAB-node DU, the F1 setup failure message comprising the allocated configuration information for the migrating IAB-node.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 5 shows a flow diagram of a method for wireless communication.

FIG. 7 shows a flow diagram of another method for wireless communication.

FIG. 8 shows a flow diagram of another method for wireless communication.

DETAILED DESCRIPTION

Figure 1A:
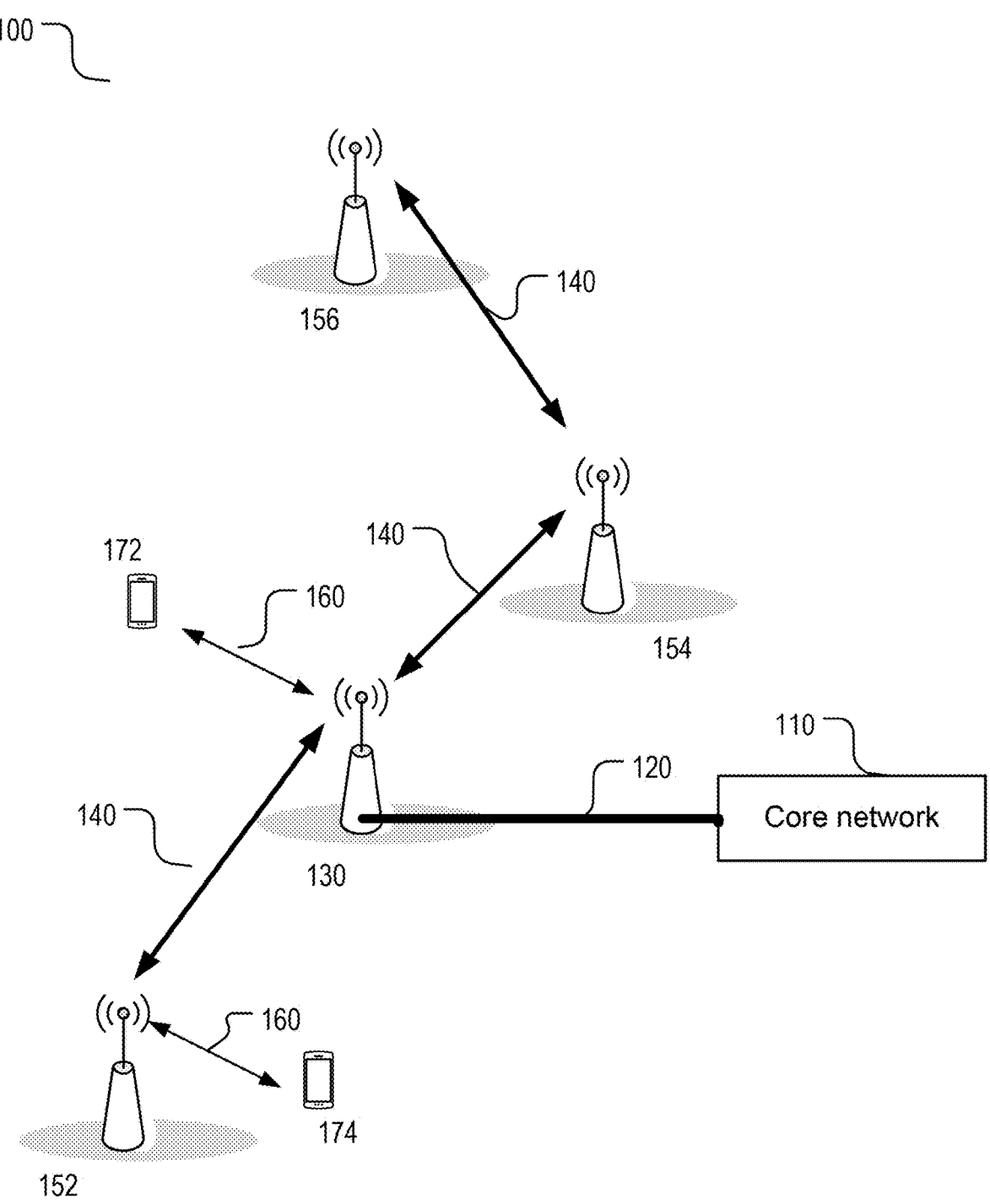
FIG. 1A shows an example of a wireless communication system include an integrated access backhaul (IAB) system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for updating integrated access backhaul (IAB) node configuration information during inter-donor migration.

Next generation (NG), or 5th generation (5G), wireless communication may provide a range of capabilities from downloading with fast speeds to support real-time low-latency communication. Compared with long-term evolution (LTE), the 5G new radio (NR) technology have a much wider spectrum, for example, including millimeter wave (mmWave) frequency bands. With the development of massive multiple input multiple output (MIMO) and/or multiple-beam systems, the 5G NR may provide a much faster speed and much shorter latency. The 5G NR may include a development of an integrated access backhaul (IAB) implementation. The IAB implementation may include one or more IAB-donors and multiple connecting IAB-nodes. The IAB implementation may communicate between one or more IAB-donors and one or more IAB-nodes via wireless backhaul and relay links. The IAB implementation may provide a flexible NR cell configuration and increase cell density without increasing the density of IAB-donors.

An IAB system may include one or more IAB-donors and one or more IAB-nodes, which collectively provide wireless connection service to one or more user equipment (UEs) (e.g., smartphones). The IAB-donors and IAB-nodes may be wireless network base stations including a NG radio access network (NG-RAN) base station, which may include a nodeB (NB, e.g., a gNB) in a mobile telecommunications context. The IAB-donor may provide access backhaul to one or more connecting child IAB-nodes, and may connect to a core network via a wired communication. In one implementation, the core network may include a 5G core network (5GC). In another implementation, the wired communication may include a fiber transport communication. The IAB-node may include wireless access link and wireless backhaul link. The wireless access link may be used for communication between a UE and the IAB-node. The wireless backhaul link may be used for communication between the IAB-node and the IAB-donor, and/or communications between one IAB-node with another IAB-node. Thus, the IAB-node does not need a wired communication network for data backhaul. In some implementations, the IAB-node does not include a wired communication network for data backhaul, so that IAB-node are more flexible and easier to implement, mitigating the burden of implementing wired communication network. The access link and backhaul link may use transmission bands with same frequency (known as in-band relay), or use transmission bands with different frequency (known as out-band relay).

Figure 1B:
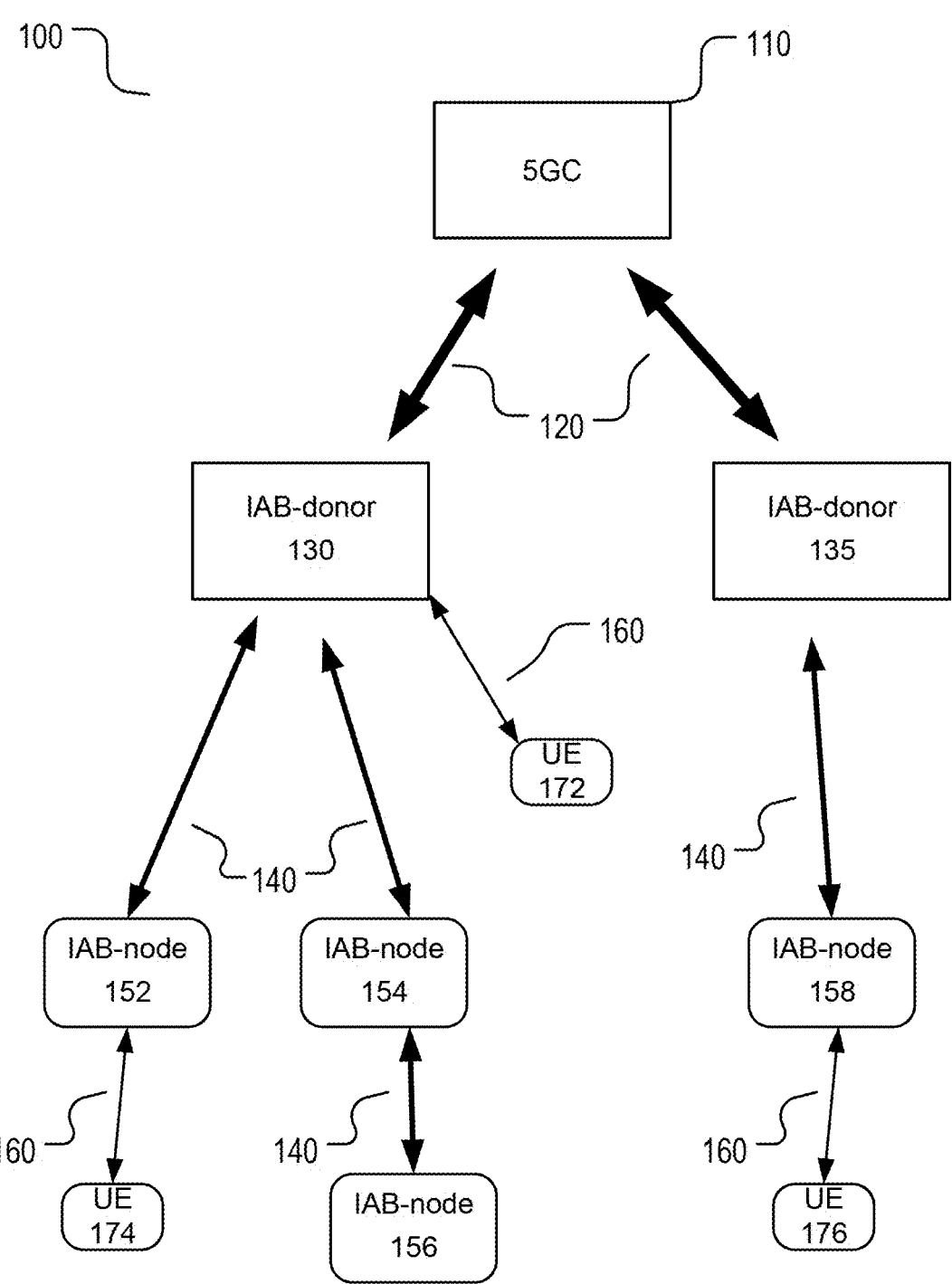
FIG. 1B shows another example of an architecture of an IAB system.

Referring to FIGS. 1A and 1B, the IAB-donor 130 may provide access backhaul 140 to one or more connecting child IAB-nodes (152 and 154). The IAB-donor 130 may connect to a core network 110 via a wired communication 120. In one implementation, the core network 110 may include a 5G core network (5GC). In another implementation, the wired communication 120 may include a fiber transport communication.

An IAB-donor may provide a wireless connection to one or more user equipment (UE). The UE may be a mobile device, for example, a smart phone or a mobile communication module disposed in a vehicle. For example, the IAB-donor 130 may provide a wireless connection 160 to a UE 172.

Similarly and without limitation, a child IAB-node may provide a wireless connection to one or more UEs. For example, the IAB-node 152 may provide a wireless connection 160 to a UE 174.

Similarly and without limitation, a child IAB-node may provide access backhaul to one or more connecting grandchild IAB-nodes. For example, the IAB-node 154 may provide access backhaul 140 to an IAB-node 156. Similarly and without limitation, the grandchild IAB-nodes may also provide access backhaul to one or more connecting great-grandchild IAB-nodes and/or provide wireless connection to one or more UEs.

Referring to FIG. 1B, the IAB system 100 may include more than one IAB-donors (130 and 135). Each of the IAB-donors may connect to a core network (e.g., 5GC) 110 via a wired communication 120. In one implementation, the IAB-donor 135 may provide access backhaul 140 to one or more connecting child IAB-nodes 158; and the IAB-node 158 may provide a wireless connection 160 to one or more UE 176.

The IAB-node 156, which currently connects to the IAB-donor 130 via the IAB-node 154, may migrate to the IAB-donor 135. This may be called as an inter-donor migration and the IAB-node 156 may be called as a migrating IAB-node. Currently, there are problems and/or issues associated with configuring the migrating IAB node during inter-donor migration.

The present disclosure describes embodiments of methods and devices of updating configuration information for the migrating IAB-node during inter-donor migration, addressing at least some of the problems discussed above.

Figure 2:
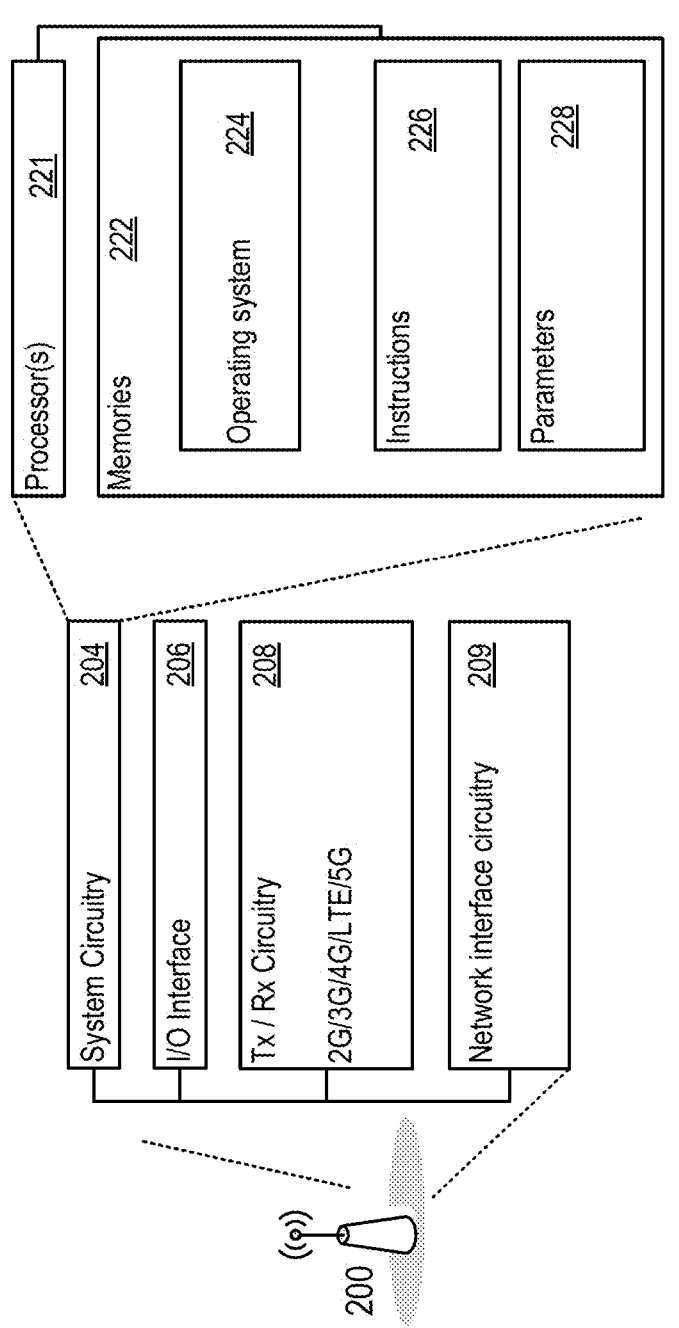
FIG. 2 shows an example of an IAB-donor or IAB-node.

FIG. 2 shows an exemplary wireless communication base station 200. The wireless communication base station 200 may be an exemplary implementation of at least one of the IAB-donors (130 and 135) and the IAB-nodes (152, 154, 156, and 158) in FIGS. 1A and 1B. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
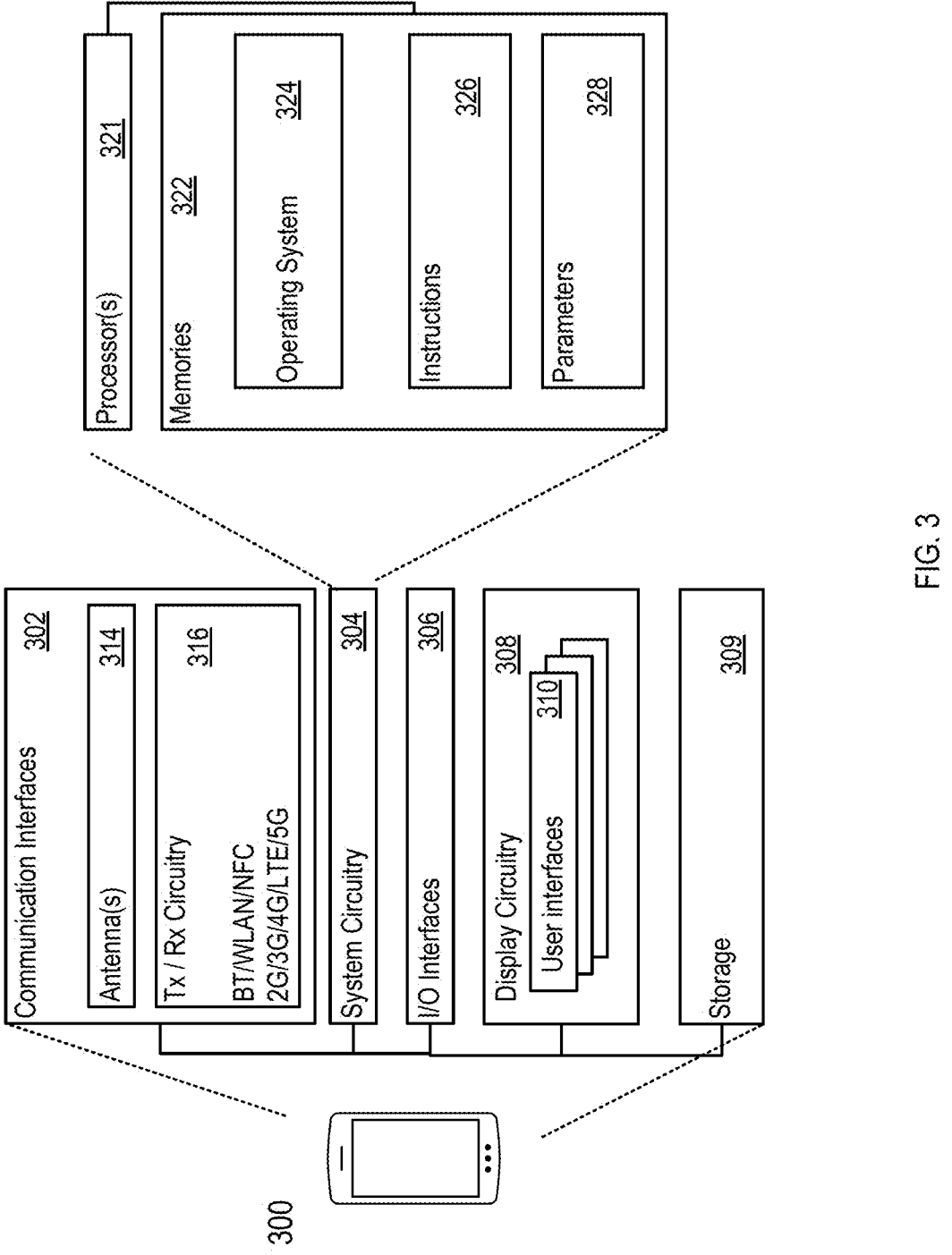
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may be an exemplary implementation of at least one of the UEs (172, 174, and 176) in FIGS. 1A and 1B. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE) , and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for updating integrated access backhaul (IAB) node configuration information during inter-donor migration, which may be implemented, partly or totally, on the wireless network base station and/or the user equipment described above in FIGS. 2 and 3.

Figure 4:
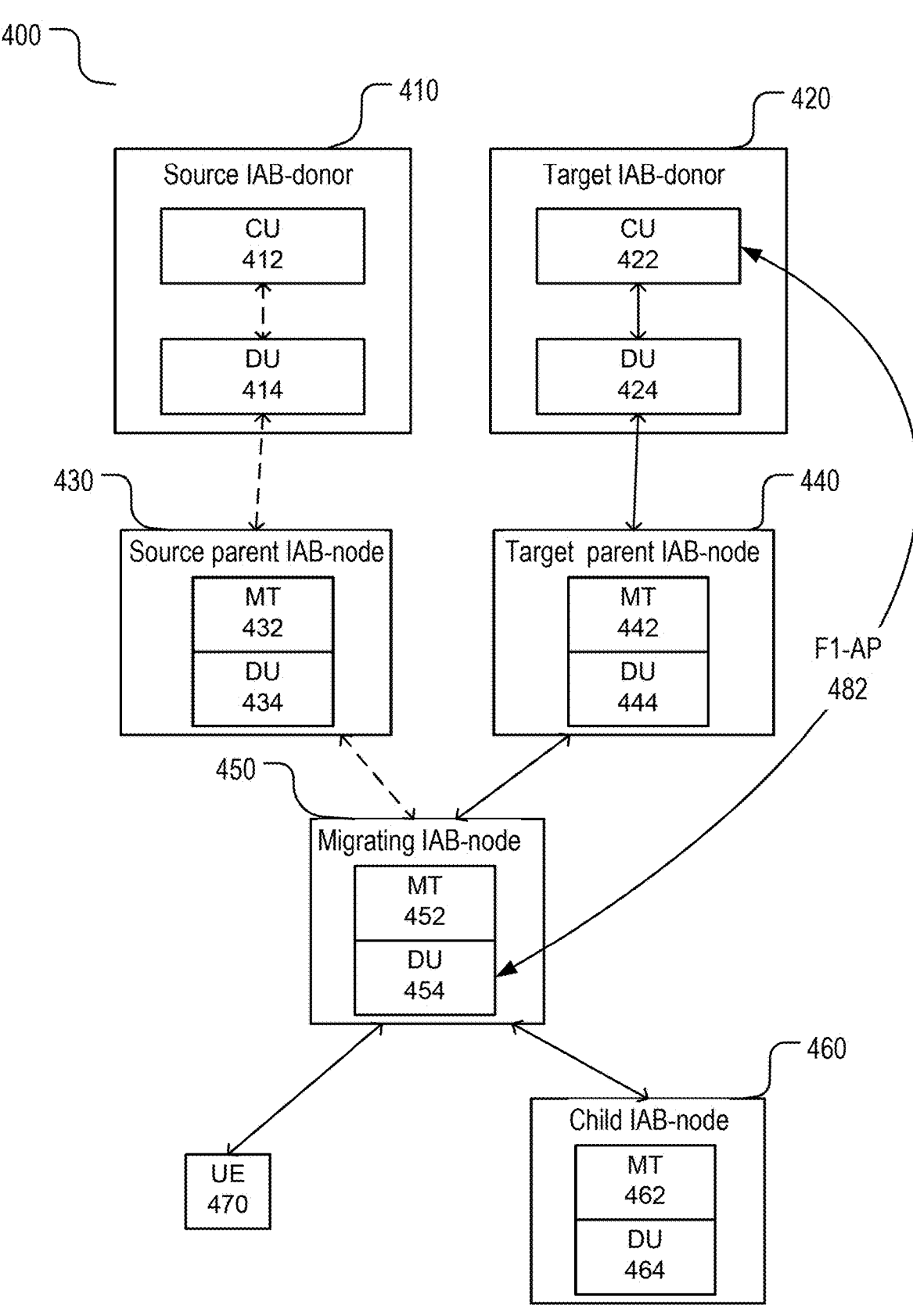
FIG. 4 shows a schematic diagram of a migrating IAB-node in an inter-donor migration.

Referring to FIG. 4, an IAB system 400 may include two IAB-donors (410 and 420). An IAB-node 450, which currently connects to the IAB-donor 410 via an IAB-node 430, may migrate to the IAB-donor 420 via an IAB-node 440. This may be called an inter-donor migration. The IAB-node 450 may be a migrating IAB-node; the IAB-donor 410 may be a source IAB-donor; the IAB-node 430 may be a source parent IAB-node; the IAB-donor 420 may be a target IAB-donor; the IAB-node 440 may be a target parent IAB-node.

The source IAB-donor 410 may include a central unit (CU) 412 and a distributed unit (DU) 414, and the source IAB-donor CU 412 may communicate with the source IAB-donor DU 414. The source parent IAB-node 430 in communication with the source IAB-donor 410 may include a mobile termination (MT) 432 and a distributed unit (DU) 434. The target IAB-donor 420 may include a CU 422 and a DU 424, and the target IAB-donor CU 422 may communicate with the target IAB-donor DU 424. The target IAB-node 440 in communication with the target IAB-donor 420 may include a MT 442 and a DU 444.

Prior to inter-donor migration, the migrating IAB-node 450 may be in communication with the source parent IAB-node 430. The migrating IAB-node 450 may include a MT 452 and a DU 454. In one implementation, the migrating IAB-node 450 may be in communication with a UE 470. In another implementation, the migrating IAB-node 450 may be in communication with a child IAB-node 460. The child IAB-node 460 may include a MT 462 and a DU 464.

Referring to FIG. 4, the migrating IAB-node 450 may change its attachment point from the source parent IAB-node 430 connecting to the source IAB-donor 410 to a target IAB-node 440 connecting to the target IAB-donor 420. In one implementation, a handover (HO) process may occur during the inter-donor migration, and this may be an inter-CU HO scenario. The migrating IAB-node DU 454 may communicate with the target IAB-donor CU 422 via F1-AP message 482.

Referring to FIG. 5, the present disclosure describes various embodiment of a method 500 for updating configuration information for a migrating IAB-node using a dedicated RRC message, for example but not limited to, a RRCReconfiguration message. The method may solve a problem/issue of a time delay associated with updating with F1-AP procedure, and using the dedicated RRC message at a handover preparation to update the configuration information may decrease the inter-donor migration time delay and improve the performance of the IAB system. The configuration information may include at least one of a gNB-DU identification (ID), a new radio (NR) physical cell identifier (PCI), a NR cell global identifier (CGI), or a Public Land Mobile Network (PLMN) Identity.

The method 500 may include a portion or all of the following steps: step 510: providing, by a target IAB-donor central unit (CU), configuration information for the migrating IAB-node distributed unit (DU) in a dedicated RRC message, for example but not limited to, a RRCReconfiguration message; step 520: sending, by the target IAB-donor CU, a XnAP message including a generated RRCReconfiguration message to a source IAB-donor, the RRCReconfiguration message comprising the provided configuration information; step 530: sending, by a source IAB-donor CU, the RRCReconfiguration message to a migrating IAB-node mobile termination (MT), the RRCReconfiguration message comprising the provided configuration information; and step 540: upon receiving the RRCReconfiguration message, forwarding, by the migrating IAB-node MT, the provided configuration information to a migrating IAB-node DU.

Figure 6A:
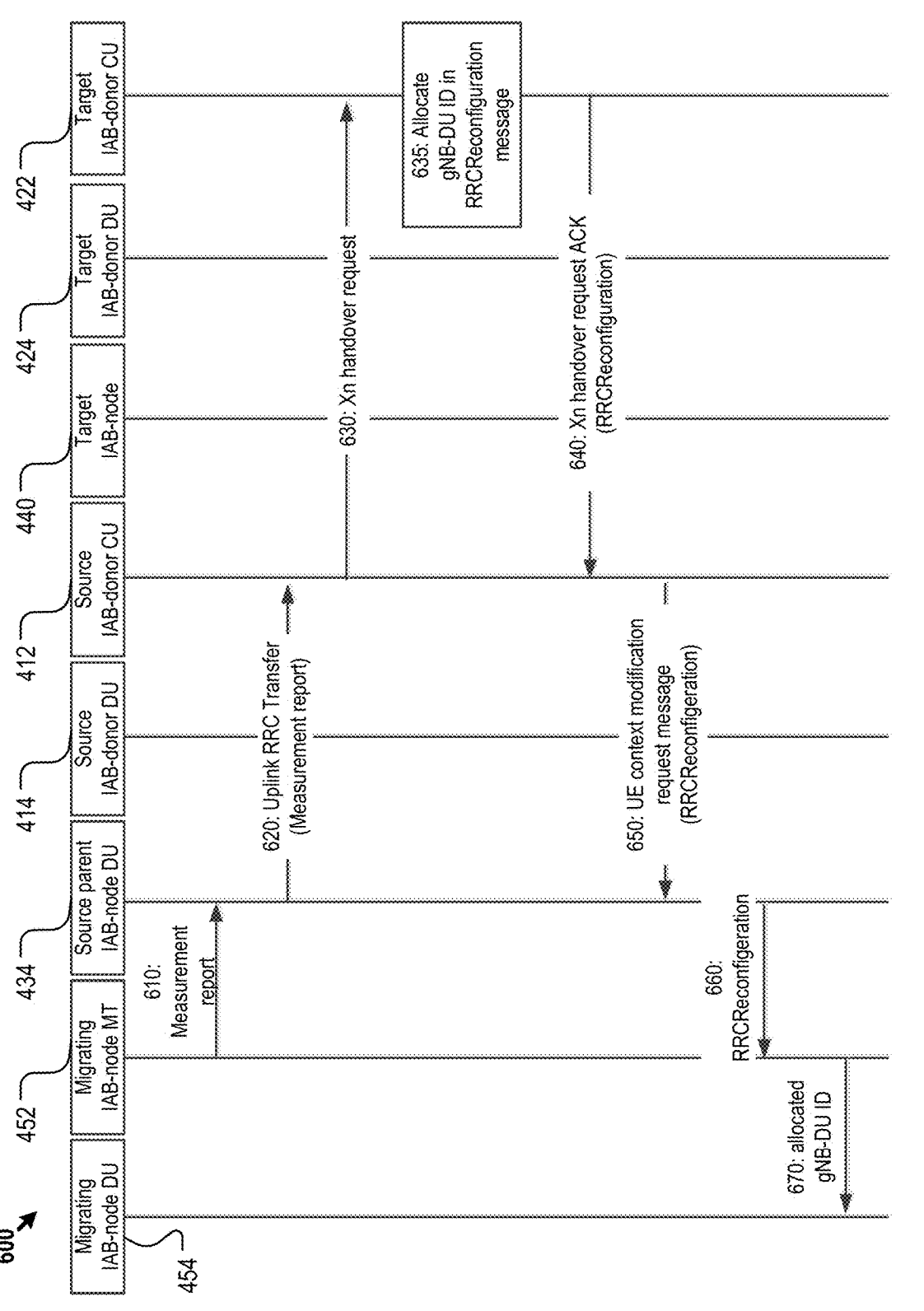
FIG. 6A shows an exemplary logic flow of the method for wireless communication in FIG. 5.

FIG. 6A shows a logic flow of a method 600 for updating a gNB-DU ID for a migrating IAB-node 450 using a dedicated RRC message during the inter-donor migration. Currently, the gNB-DU ID for the migrating IAB-node may be configured by an operations, administration and maintenance (OAM). The gNB-DU ID may be a unique identifier for the migrating IAB-node connecting with an IAB-donor. During migration, the OAM may ensure the uniqueness of the gNB-DU ID for the migrating IAB-node, which serves its primary function of identifying by the IAB-donor from which IAB-node the F1-AP communication is sent. The method 600 using a RRCReconfiguration message to update the gNB-DU ID for the migrating IAB-node at handover preparation may decrease the inter-donor migration time delay and improve the performance of the IAB system.

Referring to step 610 in FIG. 6A, the migrating IAB-node MT 452 may send a measurement report to the source parent IAB-node DU 434.

Referring to step 620 in FIG. 6A, the method 600 may include sending, by the source parent IAB-node DU 434 to convey the measurement report, the uplink radio resource control (RRC) transfer message to the source IAB-donor CU 412. The uplink RRC transfer message may include the measurement report; and receiving, by the source IAB-donor CU 412, the uplink RRC transfer message from the serving IAB-node 430.

Referring to step 630 in FIG. 6A, upon receiving the uplink RRC transfer message, to initiate handover preparation, the source IAB-donor CU 412 may send a Xn handover request message to the target IAB-donor CU 422.

Referring to step 635 in FIG. 6A, the target IAB-donor CU 422 may allocate a gNB-DU ID for the migrating IAB-node and provide the allocated gNB-DU ID in a dedicated RRC message. In one implementation, for example but not limited to, the dedicated RRC message may be a RRCReconfiguration message.

Referring to step 640 in FIG. 6A, the target IAB-donor CU 422 may send a Xn handover request acknowledge (ACK) message to the source IAB-donor CU 412. The Xn handover request acknowledge message may include the RRCReconfiguration message including the allocated gNB-DU ID.

Referring to step 650 in FIG. 6A, the source IAB-donor CU 412 may send a UE Context Modification Request message, which includes a generated RRCReconfiguration message, to source parent IAB-node DU 434. The generated downlink RRCReconfiguration message may include the allocated gNB-DU ID.

Referring to step 660 in FIG. 6A, upon receiving the UE Context Modification Request message as a F1-AP message with a RRCReconfiguration message from the source IAB-donor CU 412, the source parent IAB-node DU 434 may send the RRCReconfiguration message to the migrating IAB-node MT 452, the RRC reconfiguration message comprising the allocated gNB-DU ID.

Referring to step 670 in FIG. 6A, upon receiving the RRCReconfiguration message, the migrating IAB-node MT 452 may forward the allocated gNB-DU ID to a migrating IAB-node DU.

Figure 6B:
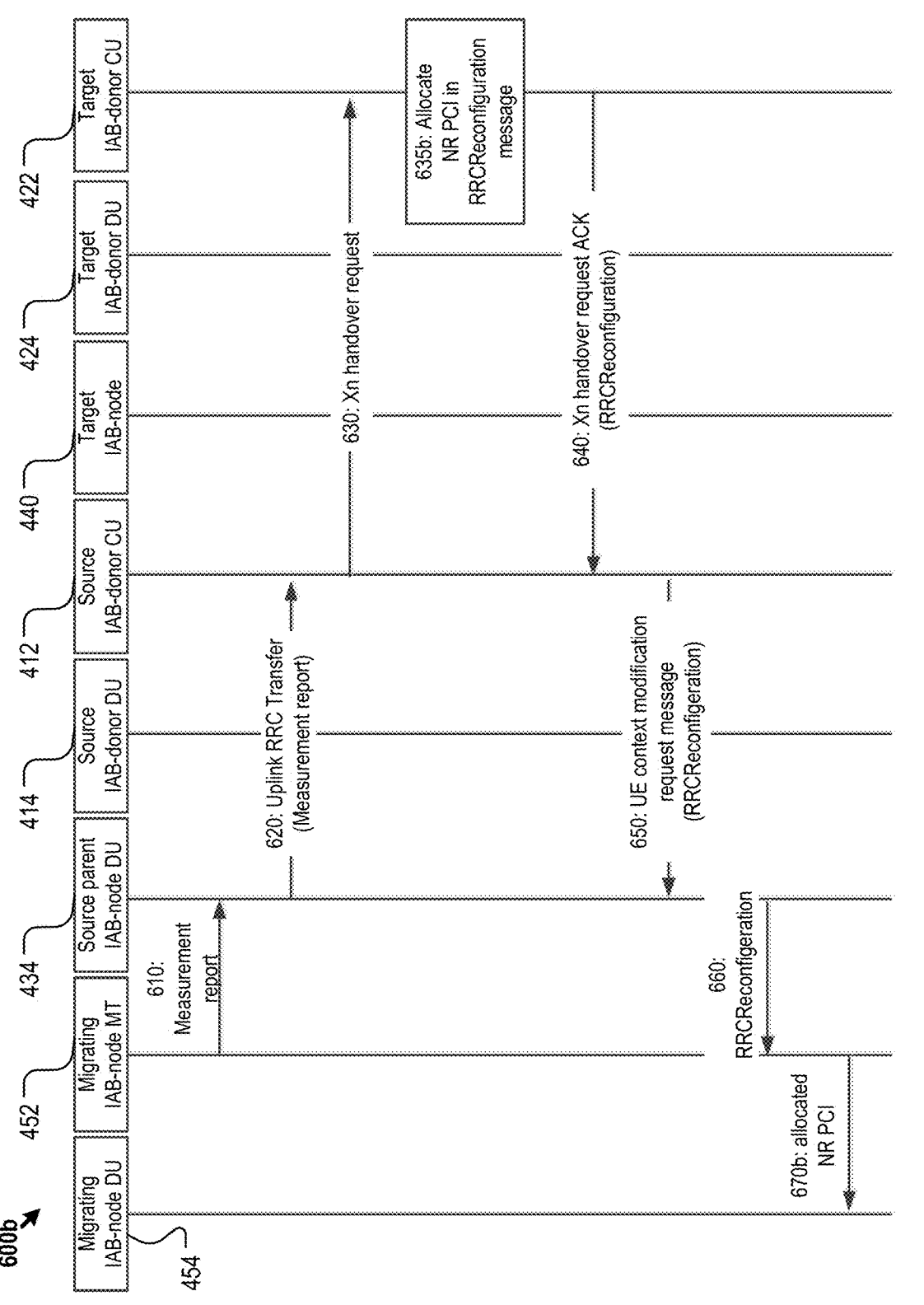
FIG. 6B shows another exemplary logic flow of the method for wireless communication in FIG. 5.

Referring to FIG. 6B, the present disclosure describes another embodiment of a method 600b for updating a NR PCI for a migrating IAB-node 450 using a dedicated RRC message during the handover preparation. Served cell information for the migrating IAB-node may be configured by the OAM in the F1 pre-operation state, and/or may be transmitted via F1 setup request to a IAB-donor CU. The served cell information may include NR CGI, NR PCI, 5GS tracking area code (TAC), and/or a public land mobile network (PLMN) ID. The method 600b using a RRCReconfiguration message to update the NR PCI for the migrating IAB-node may decrease the inter-donor migration time delay and improve the performance of the IAB system.

The method 600b may be slightly different from the method 600 in FIG. 6A. Steps 635b and 670b are different from step 635 and 670 in FIG. 6A, respectively. Rather than allocating gNB-DU ID in the dedicated RRC message in step 635, the target IAB-donor CU 422 may allocate a NR PCI in the dedicated RRC message in step 635b; and rather than forwarding the allocated gNB-DU ID to the migrating IAB-node DU 454 in step 670, the migrating IAB-node MT 452 may forward the allocated NR PCI to the migrating IAB-node DU 454 in step 670b. The method 600b may further include that the migrating IAB-node DU 454 may active the cell indicated by NR CGI and reconfigure the cell indicated by NR PCI.

Figure 6C:
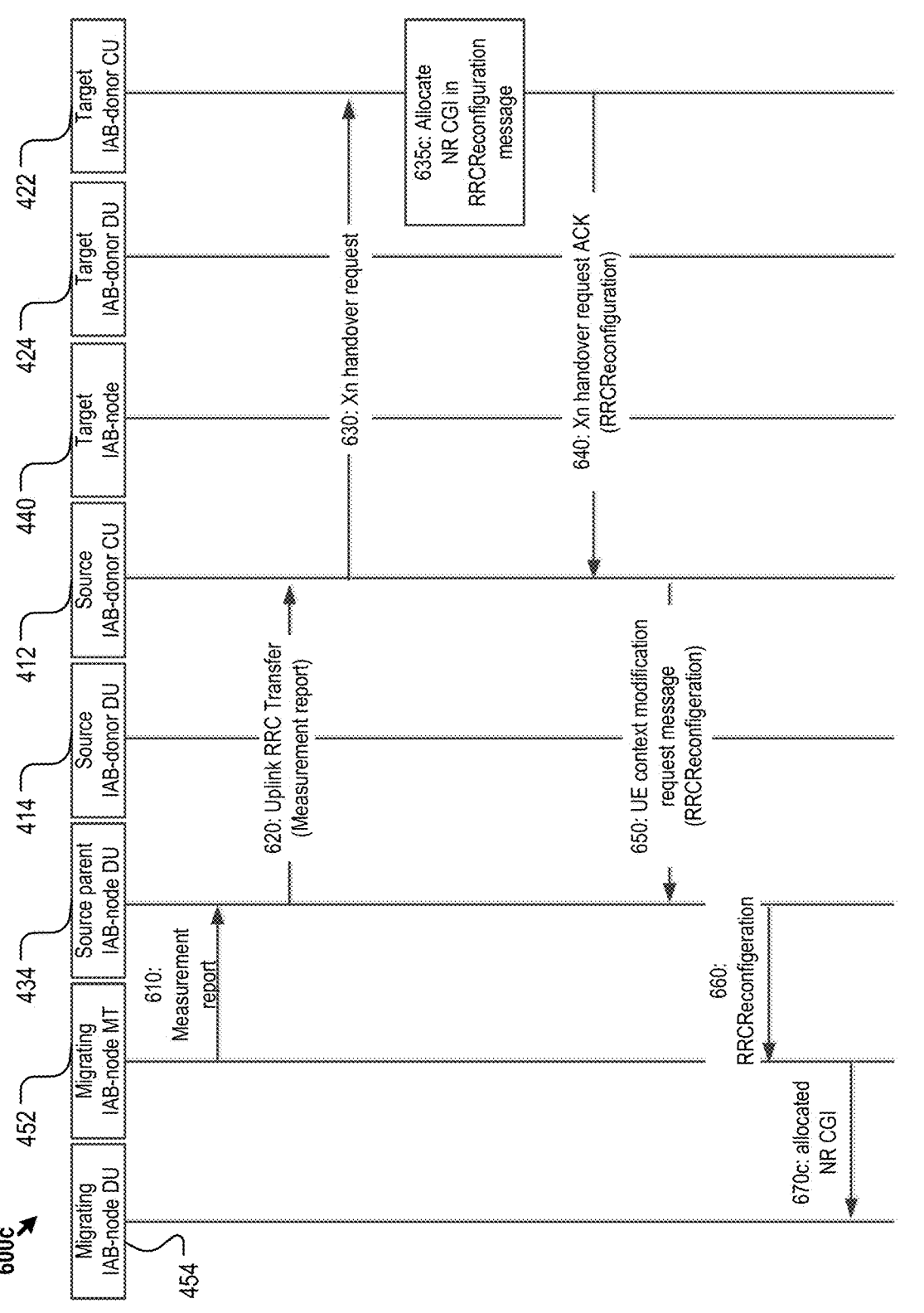
FIG. 6C shows another exemplary logic flow of the method for wireless communication in FIG. 5.

Referring to FIG. 6C, the present disclosure describes another embodiment of a method 600c for updating a NR CGI for a migrating IAB-node 450 using a RRCReconfiguration message during the inter-donor migration. A NR CGI for the migrating IAB-node may be configured by the OAM. The NR CGI may include a PLMN ID and NR cell ID. The NR cell ID may further include a gNB ID and a cell ID within the gNB. The method 600c using a dedicated RRC message to update the NR CGI for the migrating IAB-node may decrease the inter-donor migration time delay and improve the performance of the IAB system.

The method 600c may be slightly different from the method 600 in FIG. 6A. Steps 635c and 670c are different from step 635 and 670 in FIG. 6A, respectively. Rather than allocating gNB-DU ID in the dedicated RRC message in step 635, the target IAB-donor CU 422 may allocate a NR CGI in the dedicated RRC message in step 635c; and rather than forwarding the allocated gNB-DU ID to the migrating IAB-node DU 454 in step 670, the migrating IAB-node MT 452 may forward the allocated NR CGI to the migrating IAB-node DU 454 in step 670c. The method 600c may further include that the migrating IAB-node DU 454 may active the cell indicated by NR CGI and reconfigure the cell indicated by NR PCI.

Figure 6D:
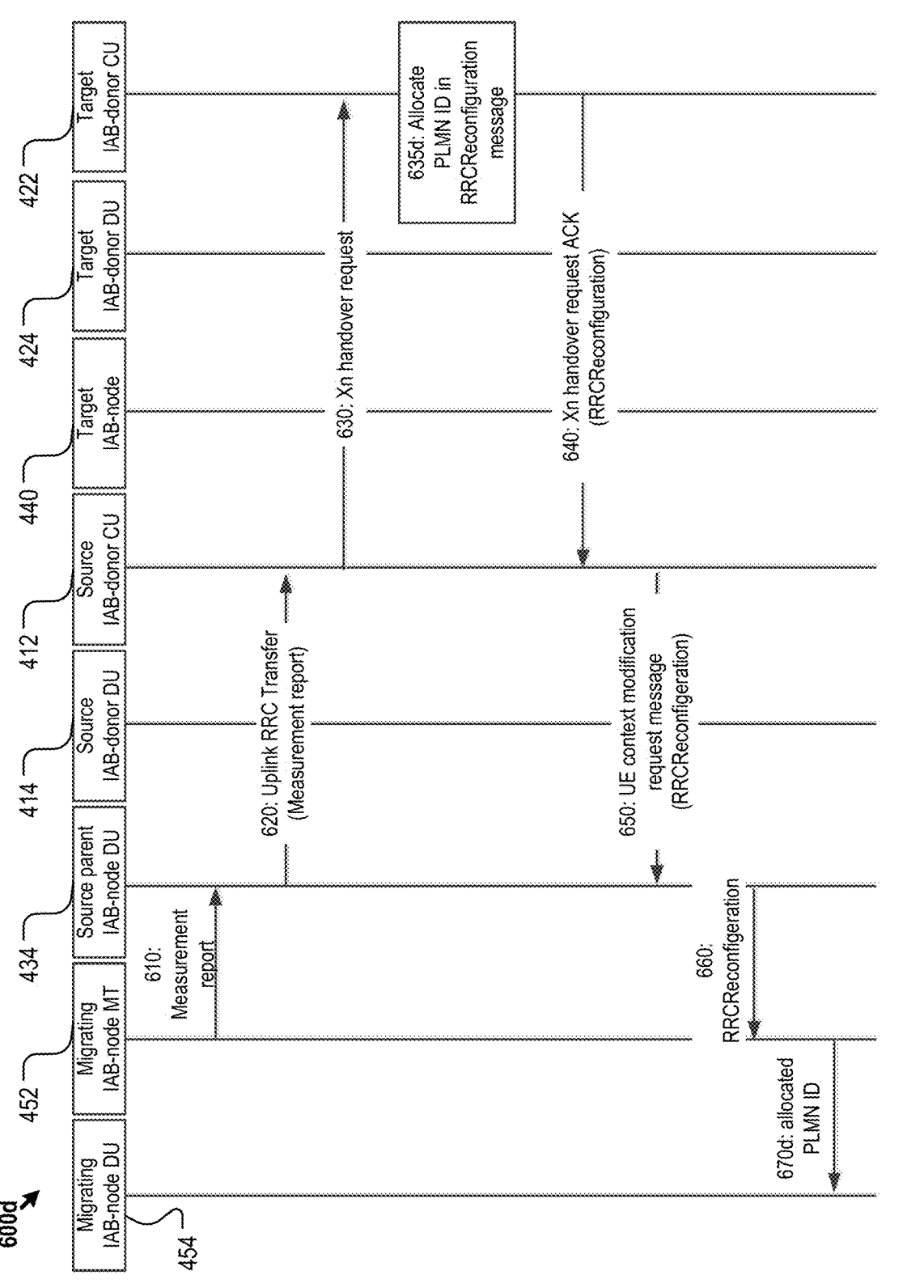
FIG. 6D shows another exemplary logic flow of the method for wireless communication in FIG. 5.

Referring to FIG. 6D, the present disclosure describes another embodiment of a method 600d for updating a PLMN ID for a migrating IAB-node 450 using a dedicated RRC message during the inter-donor migration. A PLMN ID for the migrating IAB-node may be configured by the OAM. The method 600d using a dedicated RRC message to update the PLMN ID for the migrating IAB-node may decrease the inter-donor migration time delay and improve the performance of the IAB system.

The method 600d may be slightly different from the method 600 in FIG. 6A. Steps 635d and 670d are different from step 635 and 670 in FIG. 6A, respectively. Rather than allocating gNB-DU ID in the dedicated RRC message in step 635, the target IAB-donor CU 422 may allocate a PLMN ID in the dedicated RRC message in step 635d; and rather than forwarding the allocated gNB-DU ID to the migrating IAB-node DU 454 in step 670, the migrating IAB-node MT 452 may forward the allocated PLMN ID to the migrating IAB-node DU 454 in step 670d. The method 600d may further include that the migrating IAB-node DU 454 may configure based on the allocated PLMN ID.

Figure 7:
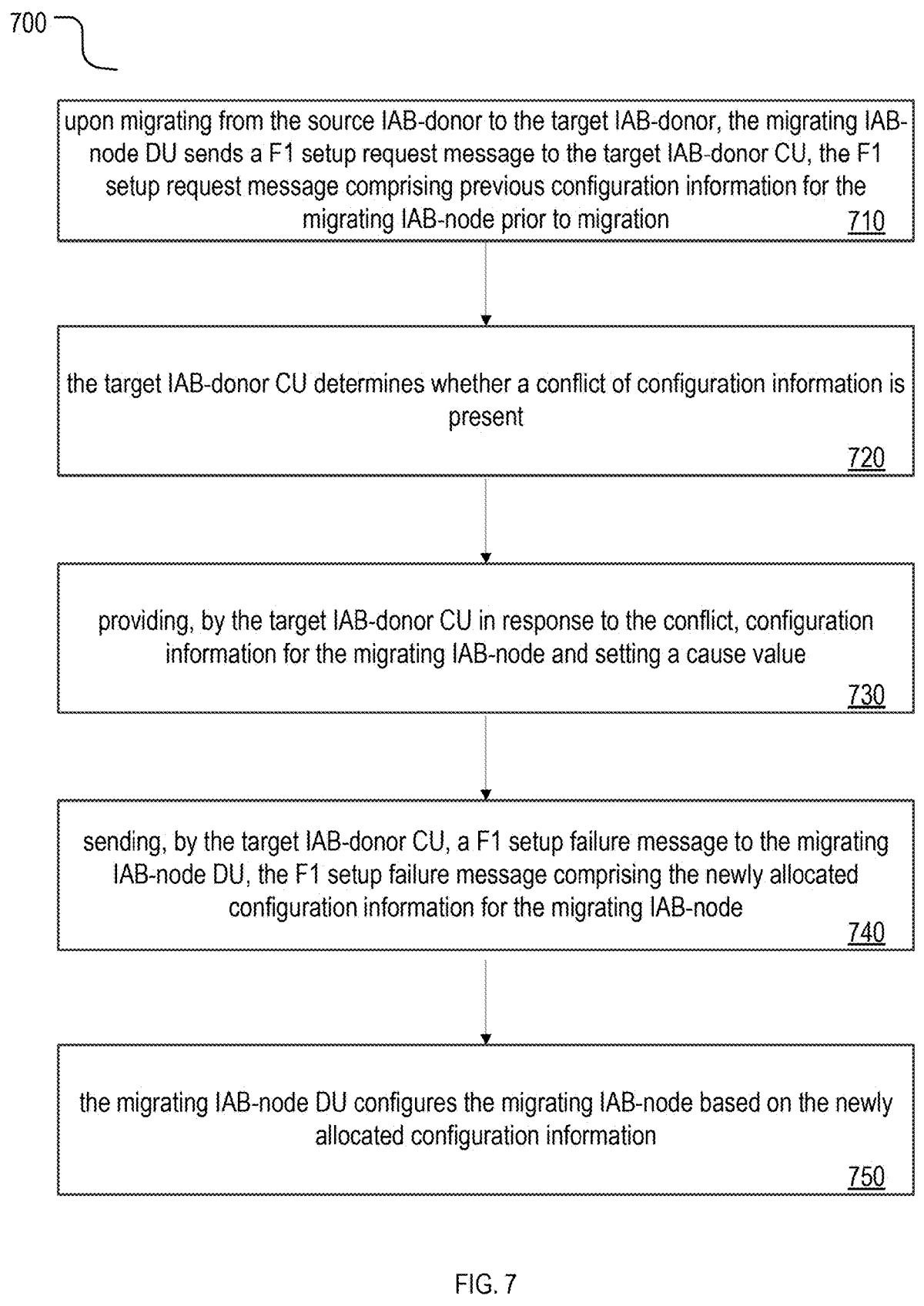

Referring to FIG. 7, the present disclosure describes various embodiment of a method 700 for updating configuration information for a migrating IAB-node using a F1 setup failure message during the inter-donor migration. The method may solve a problem/issue associated with a presence of a conflict where the previous configuration information for the migrating IAB-node is the same for some other IAB-node already connecting with the target IAB-donor. The present disclosure may solve the above conflict by allocating new configuration information by the target IAB-donor via the F1 setup failure message, thus improving the performance of the IAB system. The configuration information may include at least one of a gNB-DU identification (ID), a new radio (NR) physical cell identifier (PCI), or a NR cell global identifier (CGI).

The method 700 may include a portion or all of the following steps: step 710: upon migrating from the source IAB-donor to the target IAB-donor, the migrating IAB-node DU sends a F1 setup request message to the target IAB-donor CU, the F1 setup request message comprising previous configuration information for the migrating IAB-node prior to migration; step 720: the target IAB-donor CU determines whether a conflict of configuration information is present; step 730: providing, by the target IAB-donor CU in response to the conflict, configuration information for the migrating IAB-node and setting a cause value; and step 740: sending, by the target IAB-donor CU, a F1 setup failure message to the migrating IAB-node DU, the F1 setup failure message comprising the newly allocated configuration information for the migrating IAB-node; and step 750: the migrating IAB-node DU configures the migrating IAB-node based on the newly allocated configuration information.

In one implementation, the configuration information may include a gNB-DU ID. When the migrating IAB-node DU sends a F1 setup request message including a previous gNB-DU ID to target IAB-donor CU, the target IAB-donor CU may determine a conflict when the previous gNB-DU ID from the migrating IAB-node is the same as one of the other connecting IAB-nodes. In response to the conflict, the target IAB-donor CU sets the cause value as unknown or gNB-DU ID conflict. Upon receiving the F1 setup failure message including the allocated gNB-DU ID, the migrating IAB-node DU may configure the migrating IAB-node based on the allocated gNB-DU ID.

In another implementation, the configuration information may include a NR PCI. A number of NR PCI may be limited, and the wireless network, in reality, may need to reuse the limited number of NR PCI, thus leading to PCI confusion. When the migrating IAB-node DU sends a F1 setup request message including a previous NR PCI to target IAB-donor CU, the target IAB-donor CU may determine a conflict when the previous NR PCI from the migrating IAB-node is the same as one of the other connecting IAB-nodes. In response to the conflict, the target IAB-donor CU sets the cause value as unknown or PCI conflict. Upon receiving the F1 setup failure message including the allocated NR PCI, the migrating IAB-node DU may active the cell indicated by NR CGI and reconfigure the cell indicated by NR PCI.

In another implementation, the configuration information may include a NR CGI. The NR CGI may include a PLMN ID and NR cell ID. The NR cell ID may further include a gNB ID and a cell ID within the gNB. The migrating IAB-node DU sends a F1 setup request message including a previous NR CGI to target IAB-donor CU. The previous NR CGI may include a newly constructed NR cell ID including the target IAB-donor ID and previous cell ID within the source IAB-donor. When the previous cell ID within the source IAB-donor is the same to a cell ID of any other IAB-node within the target IAB-donor, the target IAB-node may determine the conflict. In response to the conflict, the target IAB-donor CU sets the cause value as unknown or CGI conflict. Upon receiving the F1 setup failure message including the allocated NR CGI, the migrating IAB-node DU may active the cell indicated by NR CGI and reconfigure the cell indicated by NR PCI.

Figure 8:
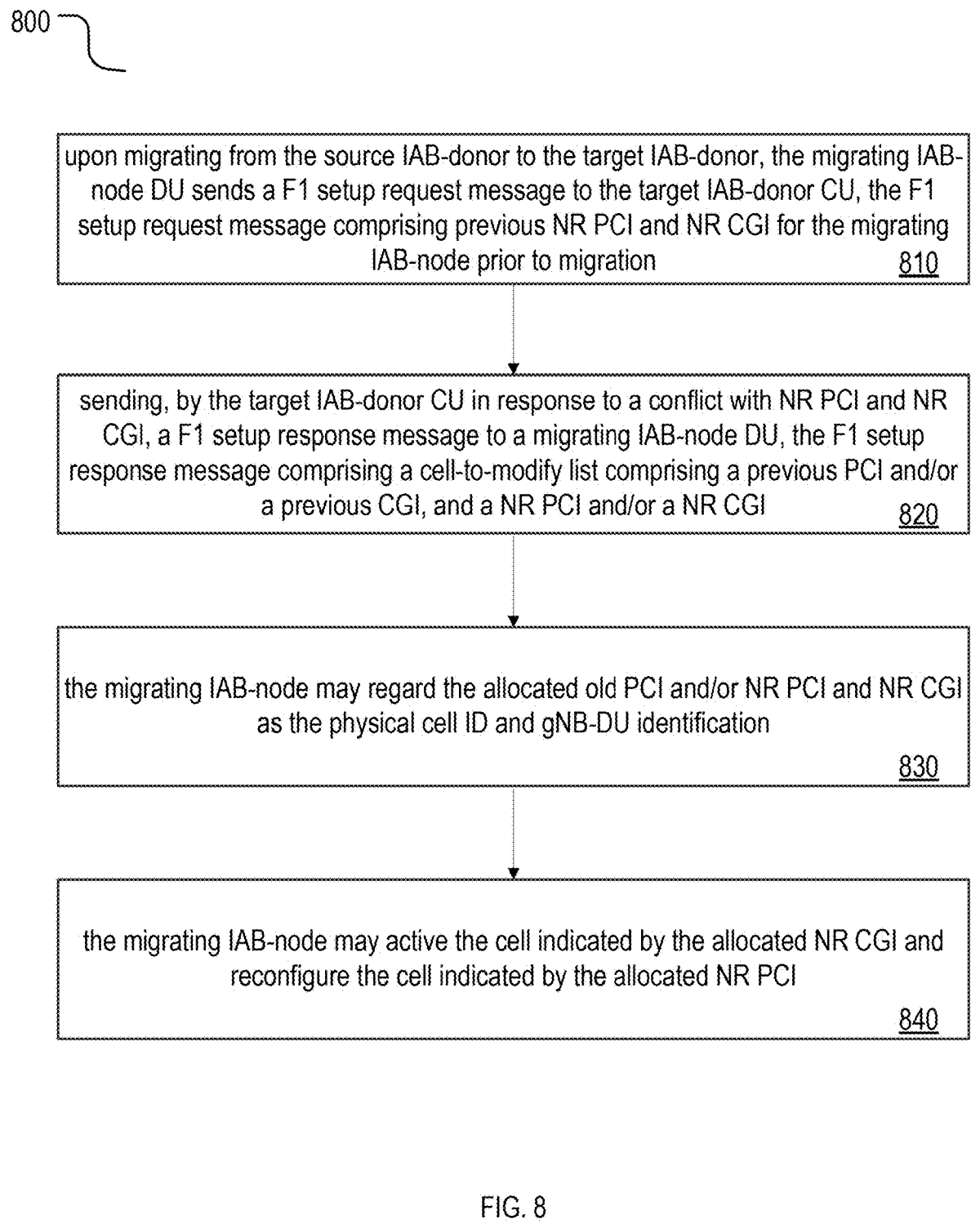

Referring to FIG. 8, the present disclosure describes various embodiments of a method 800 for updating NR PCI and NR CGI for a migrating IAB-node using a F1 setup response message including a cell-to-modify list during the inter-donor migration. The method may solve a problem/issue associated with a presence of a conflict for both NR PCI and/or NR CGI.

The method 800 may include a portion or all of the following steps: step 810: upon migrating from the source IAB-donor to the target IAB-donor, the migrating IAB-node DU sends a F1 setup request message to the target IAB-donor CU, the F1 setup request message comprising previous NR PCI and NR CGI for the migrating IAB-node prior to migration; step 820: sending, by the target IAB-donor CU in response to a conflict with NR PCI and NR CGI, a F1 setup response message to a migrating IAB-node DU, the F1 setup response message comprising a cell-to-modify list comprising a previous PCI and/or a previous CGI, and a NR PCI and/or a NR CGI; step 830: the migrating IAB-node may regard the allocated old PCI and/or NR PCI and NR CGI as the physical cell ID and gNB-DU identification; step 840: the migrating IAB-node may active the cell indicated by the allocated NR CGI and reconfigure the cell indicated by the allocated NR PCI. In the cell-to-modify list, the NR PCI corresponds to the previous PCI; and the NR CGI corresponds to the previous CGI.

In one implementation, in response to a CGI conflict alone, the cell-to-modify list may include the previous CGI, the NR PCI, and the NR CGI. In another implementation, in response to a PCI conflict alone, the cell-to-modify list may include the previous PCI, the NR PCI, and the NR CGI. In another implementation, in response to the PCI conflict and the CGI conflict, the cell-to-modify list may include the previous PCI, the previous CGI, the NR PCI, and the NR CGI.

The present disclosure describes methods, apparatus, and computer-readable medium for wireless communication. The present disclosure addressed the issues with updating integrated access backhaul (IAB) node configuration information during inter-donor migration. The methods, devices, and computer-readable medium described in the present disclosure may facilitate the performance of wireless communication by using a dedicated RRC message, or using a F1-AP message, or using a F1 setup failure message to send new configuration information to the migrating IAB-node during inter-donor migration, thus improving migration efficiency and overall wireless network performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
updating configuration information for a migrating integrated access backhaul node (IAB-node) during an inter-donor migration from a source IAB-donor to a target IAB-donor by:

sending, by a target IAB-donor central unit (CU), a F1-AP message to a migrating IAB-node distributed unit (DU), the F1-AP message comprising new configuration information comprising a new radio (NR) cell global identifier (CGI),
wherein:
the F1-AP message further comprises previous configuration information, the previous configuration information comprising a previous CGI, and
the new configuration information comprises a new radio (NR) physical cell identifier (PCI).

2. The method according to claim 1, wherein:
the new configuration information comprises a new generation radio access network node DU (gNB-DU) identification (ID).

3. An apparatus comprising:
a memory storing instructions; and
a processor in communication with the memory, wherein, when the processor executes the instructions, the processor is configured to cause the apparatus to perform:
updating configuration information for a migrating integrated access backhaul node (IAB-node) during an inter-donor migration from a source IAB-donor to the apparatus by:
sending, by a central unit (CU) of the apparatus, a F1-AP message to a migrating IAB-node distributed unit (DU), the F1-AP message comprising new configuration information comprising a new radio (NR) cell global identifier (CGI),
wherein:
the F1-AP message further comprises previous configuration information, the previous configuration information comprising a previous CGI, and
the new configuration information comprises a new radio (NR) physical cell identifier (PCI).

4. The apparatus according to claim 3, wherein:
the new configuration information comprises a new generation radio access network node DU (gNB-DU) identification (ID).

5. A non-transitory computer-readable medium storing instructions, wherein, the instructions, when executed by a processor of a target integrated access backhaul (IAB)-donor central unit (CU), are configured to cause the processor to update configuration information for a migrating IAB-node during an inter-donor migration from a source IAB-donor to a target IAB-donor by:
sending a F1-AP message to a migrating IAB-node distributed unit (DU), the F1-AP message comprising new configuration information comprising a new radio (NR) cell global identifier (CGI),
wherein:
the F1-AP message further comprises previous configuration information, the previous configuration information comprising a previous CGI, and
the new configuration information comprises a new radio (NR) physical cell identifier (PCI).

6. The non-transitory computer-readable medium according to claim 5, wherein:
the new configuration information comprises a new generation radio access network node DU (gNB-DU) identification (ID).

* * * * *